United States Patent
Ellison

(10) Patent No.: US 7,851,394 B2
(45) Date of Patent: ***Dec. 14, 2010

(54) FINING OF BOROALUMINO SILICATE GLASSES

(75) Inventor: Adam J. G. Ellison, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 11/478,493

(22) Filed: Jun. 28, 2006

(65) Prior Publication Data

US 2006/0293162 A1 Dec. 28, 2006

Related U.S. Application Data

(60) Provisional application No. 60/694,478, filed on Jun. 28, 2005.

(51) Int. Cl.
  *C03C 3/076* (2006.01)
  *C03C 3/089* (2006.01)
  *C03C 3/091* (2006.01)
(52) U.S. Cl. ............................... 501/66; 501/55; 501/65
(58) Field of Classification Search .................. 501/66, 501/55, 65
  See application file for complete search history.

(56) References Cited

U.S. PATENT DOCUMENTS

| | | | | |
|---|---|---|---|---|
| 3,338,696 A | 8/1967 | Dockerty | ..................... | 65/145 |
| 3,682,609 A | 8/1972 | Dockerty | ..................... | 65/83 |
| 4,180,618 A | 12/1979 | Alpha et al. | | |
| 5,374,595 A | 12/1994 | Dumbaugh et al. | ............ | 501/66 |
| 5,785,726 A | 7/1998 | Dorfeld et al. | ............ | 65/134.1 |
| 5,824,127 A | 10/1998 | Bange et al. | ................... | 65/90 |
| 6,128,924 A | 10/2000 | Bange et al. | ................... | 65/90 |
| 6,169,047 B1 * | 1/2001 | Nishizawa et al. | ............ | 501/66 |
| 6,319,867 B1 | 11/2001 | Chacon et al. | ................ | 501/66 |
| 6,468,933 B1 * | 10/2002 | Narita et al. | ................... | 501/56 |
| 6,537,937 B1 * | 3/2003 | Nishizawa et al. | ............ | 501/66 |
| 6,881,692 B2 | 4/2005 | Murata et al. | | |
| 6,992,030 B2 | 1/2006 | Paulson | | |
| 2002/0023463 A1 * | 2/2002 | Siebers et al. | ................ | 65/99.5 |
| 2003/0121288 A1 | 7/2003 | Naka et al. | ................. | 65/134.3 |
| 2006/0003884 A1 | 1/2006 | Nishizawa et al. | | |

FOREIGN PATENT DOCUMENTS

| | | |
|---|---|---|
| EP | 0 607 865 | 7/1994 |
| JP | 2001-348247 | 12/2001 |
| JP | 2004-189535 | 7/2004 |
| RU | 642265 | 1/1979 |
| WO | 2004/087597 | 10/2004 |

OTHER PUBLICATIONS

U.S. Appl. No. 11/116,669, G. DeAngelis et al., filed Apr. 27, 2005.

* cited by examiner

*Primary Examiner*—C. Melissa Koslow
*Assistant Examiner*—Matthew E Hoban
(74) *Attorney, Agent, or Firm*—Thomas R. Beall; Maurice M. Klee

(57) ABSTRACT

Glasses are disclosed which can be used to produce substrates for flat panel display devices, e.g., active matrix liquid crystal displays (AMLCDs). The glasses have MgO concentrations in the range from 1.0 mole percent to 3.0 mole percent and $\Sigma[RO]/[Al_2O_3]$ ratios greater than or equal to 1.00, where $[Al_2O_3]$ is the mole percent of $Al_2O_3$ and $\Sigma[RO]$ equals the sum of the mole percents of MgO, CaO, SrO, and BaO. These compositional characteristics have been found to improve the melting properties of batch materials used to produce the glass, which, in turn, allows the glasses to be fined (refined) with more environmentally friendly fining agents, e.g., tin as opposed to arsenic and/or antimony.

16 Claims, 3 Drawing Sheets

FINING OF BOROALUMINO SILICATE GLASSES

I. CROSS-REFERENCE TO RELATED APPLICATIONS

This application claims the benefit of U.S. Application Ser. No. 60/694,478 filed on Jun. 28, 2005 and entitled "Fining of Boroalumino Silicate Glasses" which is incorporated by reference herein in.

II. FIELD OF THE INVENTION

The present invention relates to alkali-free, boroalumino silicate glasses exhibiting desirable physical and chemical properties for use as substrates in flat panel display devices, such as, active matrix liquid crystal displays (AMLCDs). In accordance with certain of its aspects, the invention relates to the fining of such glasses (also referred to in the art as "refining").

III. BACKGROUND OF THE INVENTION

Displays may be broadly classified into one of two types: emissive (e.g., CRTs and plasma display panels (PDPs)) or non-emissive. This latter family, to which liquid crystal displays (LCDs) belong, relies upon an external light source, with the display only serving as a light modulator. In the case of liquid crystal displays, this external light source may be either ambient light (used in reflective displays) or a dedicated light source (such as found in direct view displays).

Liquid crystal displays rely upon three inherent features of liquid crystal (LC) materials to modulate light. The first is the ability of LC materials to cause optical rotation of polarized light. Second is the dependence of such rotation on the mechanical orientation of the liquid crystal. And third is the ability of the liquid crystal to undergo mechanical orientation by the application of an external electric field. In the construction of a simple, twisted nematic (TN) liquid crystal display, two substrates surround a layer of liquid crystal material. In a display type known as Normally White, the application of alignment layers on the inner surfaces of the substrates creates a 90° spiral of the liquid crystal director. This means that the polarization of linearly polarized light entering one face of the liquid crystal cell will be rotated 90° by the liquid crystal material. Polarization films, oriented 90° to each other, are placed on the outer surfaces of the substrates.

Light, upon entering the first polarization film becomes linearly polarized. Traversing the liquid crystal cell, the polarization of this light is rotated 90° and is allowed to exit through the second polarization film. Application of an electric field across the liquid crystal layer aligns the liquid crystal directors with the field, interrupting its ability to rotate light. Linearly polarized light passing through this cell does not have its polarization rotated and hence is blocked by the second polarization film. Thus, in the simplest sense, the liquid crystal material becomes a light valve, whose ability to allow or block light transmission is controlled by the application of an electric field.

The above description pertains to the operation of a single pixel in a liquid crystal display. High information type displays require the assembly of several million of these pixels, which are referred to in the art as sub pixels, into a matrix format. Addressing all of these sub pixels, i.e., applying an electric field to all of these sub pixels, while maximizing addressing speed and minimizing cross-talk presents several challenges. One of the preferred ways to address sub pixels is by controlling the electric field with a thin film transistor located at each sub pixel, which forms the basis of active matrix liquid crystal display devices (AMLCDs).

The manufacturing of these displays is extremely complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. No. 3,338,696 (Dockerty) and U.S. Pat. No. 3,682,609 (Dockerty), is one of the few processes capable of delivering glass sheets which can be used as substrates without requiring costly post forming finishing operations, such as lapping and polishing. Unfortunately, the fusion process places rather severe restrictions on the glass properties, requiring relatively high liquidus viscosities, preferably greater than 100,000 poises, more preferably, greater than 150,000 poises.

Typically, the two plates (substrate assemblies) that comprise a flat panel display are manufactured separately. One, the color filter plate, has a series of red, blue, green, and black organic dyes deposited on it. Each of these primary colors must correspond precisely with a sub pixel of the companion active plate. To remove the influence of differences between the ambient thermal conditions encountered during the manufacture of the two plates, it is desirable to use glass substrates whose dimensions are independent of thermal condition (i.e., glasses with lower coefficients of thermal expansion). However, this property needs to be balanced by the generation of stresses between deposited films (e.g., silicon films) and the substrates that arise due to expansion mismatch. It is estimated that an optimal coefficient of thermal expansion (CTE) is in the range of $28\text{-}34 \times 10^{-7}/°$ C. ($0\text{-}300°$ C.), more preferably, $28\text{-}33 \times 10^{-7}/°$ C. ($0\text{-}300°$ C.).

The active plate, so called because it contains the active, thin film transistors, is manufactured using typical semiconductor type processes. These include sputtering, CVD, photolithography, and etching. It is highly desirable that the glass be unchanged during these processes. Thus, the glass needs to demonstrate both thermal stability and chemical durability.

Thermal stability (also known as thermal compaction or shrinkage) is dependent upon both the inherent viscous nature of a particular glass composition (as indicated by its strain point) and the thermal history of the glass sheet as determined by the manufacturing process. U.S. Pat. No. 5,374,595 (Dumbaugh et al.) and U.S. Pat. No. 6,319,867 (Chacon et al.) disclose glasses with strain points in excess of 650° C. which, when subjected to the thermal history of the fusion process, have acceptable thermal stability for active plates based both on a-Si thin film transistors (TFTs) and super low temperature p-Si TFTs. Higher temperature processing (such as required by low temperature p-Si TFTs) may require the addition of an annealing step to the glass substrate to ensure thermal stability.

Chemical durability implies a resistance to attack by the various etchant solutions used in the manufacture processes. Of particular interest is a resistance to attack from the dry etching conditions used to etch the silicon layer. To benchmark the dry etch conditions, a substrate sample is exposed to an etchant solution known as 110BHF. This test consists of immersing a sample of glass in a solution of 1 volume of 50 wt. % HF and 10 volumes 40 wt. % $NH_4F$ at 30° C. for 5 minutes. The sample is graded on weight loss and appearance. In addition to the 110BHF test, glass substrates are also tested for their resistance to acid conditions. In this case, the etchant solution is 5% HCl and the glass sample is immersed in the test solution for 24 hours at 95° C.

In addition to these requirements, AMLCD manufacturers are finding that both demand for larger display sizes and the economics of scale are driving them to process larger sized pieces of glass. Current industry standards are Gen VI (1500 mm×1850 mm) and Gen VII (1870 mm×2200 mm), but future efforts are geared toward even larger sizes in excess of 2 meters on each side. This raises several concerns.

First is simply the weight of the glass. The increase in glass weight in going from one generation to the next has significant implications for the robotic handlers used to ferry the glass into and through process stations. In addition, elastic sag, which is dependent upon glass density and Young's modulus, becomes a particularly critical issue with larger sheet sizes, impacting the ability to load, retrieve, and space the glass in the cassettes used to transport the glass between process stations.

In addition to the weight and sag problems, the increasing sizes of substrates leads to greater challenges in terms of manufacturing defect-free glass sheets. Because of the small sizes of sub pixels, substrates used for display applications must be essentially completely defect free.

One of the primary sources of defects is gaseous inclusions (also known as "seeds") resulting from entrapment of air in the molten glass as batch materials are melted. Historically, such gaseous inclusions have been removed through the use of arsenic as a fining agent. However, arsenic raises environmental and health issues, and thus there has been a continuing effort in the art to produce glasses with lower arsenic levels and, preferably, glasses which are substantially arsenic free. U.S. Pat. No. 5,785,726 (Dorfeld et al.) U.S. Pat. No. 6,128,924 (Bange et al.) U.S. Pat. No. 5,824,127 (Bange et al.) and co-pending patent application Ser. No. 11/116,669 disclose processes for manufacturing arsenic free glasses.

Efforts have been made to replace arsenic fining with antimony fining. However, antimony has its own environmental and health issues. Also, compared to arsenic, antimony is a less effective fining agent.

In quantitative terms, the gaseous inclusion level in commercially produced glass sheets needs to be less than or equal to 0.10 gaseous inclusions/cm$^3$ of glass and preferably less than or equal to 0.05 inclusions/cm$^3$ for sheets having a volume of at least 500 cm$^3$. Moreover, it is not sufficient to achieve a low level of gaseous inclusions in one or just a few glass sheets, but in order to be cost effective, glass manufacturers need to achieve the above low inclusion levels consistently. A measure of such consistency is to examine the gaseous defect level in a population of sequentially produced glass sheets, e.g., 50 sequential glass sheets. Thus, to have commercial viability, a glass intended for use as a substrate in display applications needs to achieve the above (or better) gaseous inclusion levels on average for at least 50 sequential sheets.

In view of the foregoing, it would be desirable to provide a glass composition for display devices having a low density to alleviate difficulties associated with larger sheet size, preferably less than or equal to 2.45 grams/cm$^3$ and a liquidus viscosity greater than or equal to 100,000 poises to allow manufacture by, for example, the fusion process. In addition, it would be desirable for the glass to have a thermal expansion coefficient (CTE) in the range of 28-34×10$^{-7}$/° C., and preferably between about 28-33×10$^{-7}$/° C., over the temperature range of 0-300° C. Furthermore, it would be advantageous for the glass to have a strain point greater than 650° C., and for the glass to be resistant to attack from etchant solutions. It would also be desirable for the glass to have a low gaseous inclusion level when commercially manufactured without the use of arsenic and/or antimony as fining agents.

IV. SUMMARY OF THE INVENTION

In accordance with a first aspect, the invention provides an alkali-free glass comprising in mole percent on an oxide basis:

| | |
|---|---|
| $SiO_2$: | 64.0-71.0 |
| $Al_2O_3$: | 9.0-12.0 |
| $B_2O_3$: | 7.0-12.0 |
| MgO: | 1.0-3.0 |
| CaO: | 6.0-11.5 |
| SrO: | 0-2.0 (preferably 0-1.0) |
| BaO: | 0-0.1 | wherein:

(a) $1.00 \leq \Sigma[RO]/[Al_2O_3] \leq 1.25$ (preferably, $1.03 \leq \Sigma[RO]/[Al_2O_3] \leq 1.12$), where $[Al_2O_3]$ is the mole percent of $Al_2O_3$ and $\Sigma[RO]$ equals the sum of the mole percents of MgO, CaO, SrO, and BaO; and (b) the glass has at least one (and preferably both) of the following compositional characteristics:

(i) on an oxide basis, the glass comprises at most 0.05 mole percent $Sb_2O_3$;

(ii) on an oxide basis, the glass comprises at least 0.01 mole percent $SnO_2$.

Preferably, the glass has the further compositional characteristic that on an oxide basis, the glass comprises at most 0.05 mole percent $As_2O_3$.

In accordance with a second aspect, the invention provides an alkali-free glass comprising in mole percent on an oxide basis:

| | |
|---|---|
| $SiO_2$: | 64.0-71.0 |
| $Al_2O_3$: | 9.0-12.0 |
| $B_2O_3$: | 7.0-12.0 |
| MgO: | 1.0-3.0 |
| CaO: | 6.0-11.5 |
| SrO: | 0-1.0 |
| BaO: | 0-0.1 | wherein:

$\Sigma[RO]/[Al_2O_3] \geq 1.00$ (preferably, $\Sigma[RO]/[Al_2O_3] \geq 1.03$).

Preferably, the $\Sigma[RO]/[Al_2O_3]$ ratio is less than or equal to 1.25 (more preferably, less than or equal to 1.12). Also, the glass preferably has at least one (more preferably, all) of the following compositional characteristics:

(a) on an oxide basis, the glass comprises at most 0.05 mole percent $As_2O_3$;

(b) on an oxide basis, the glass comprises at most 0.05 mole percent $Sb_2O_3$;

(c) on an oxide basis, the glass comprises at least 0.01 mole percent $SnO_2$.

In accordance with a third aspect, the invention provides a method for producing alkali-free glass sheets by a downdraw process (e.g., a fusion process) comprising selecting, melting, and fining batch materials so that the glass making up the sheets comprises $SiO_2$, $Al_2O_3$, $B_2O_3$, MgO, and CaO, and, on an oxide basis, has:

(i) a $\Sigma[RO]/[Al_2O_3]$ ratio greater than or equal to 1.0; and (ii) a MgO content greater than or equal to 1.0 mole percent (and preferably less than or equal to 3.0 mole percent);

wherein:

(a) the fining is performed without the use of substantial amounts of either arsenic or antimony (i.e., the concentrations of $As_2O_3$ and $Sb_2O_3$ are each less than or equal to 0.05 mole percent); and (b) a population of 50 sequential glass sheets produced by the downdraw process from the melted and fined batch materials has an average gaseous inclusion level of less than 0.05 gaseous inclusions/cubic centimeter, where each sheet in the population has a volume of at least 500 cubic centimeters.

Preferably, the glass making up the sheet is also substantially free of BaO (i.e., the concentration of BaO is less than or equal to 0.05 mole percent). Also, $SnO_2$ is preferably used in the fining.

In accordance with each of the foregoing aspects of the invention, the glass preferably has some and most preferably all of the following properties:

(a) a density that is less than or equal to 2.41 grams/cm$^3$;
(b) a liquidus viscosity that is greater than or equal to 100,000 poise;
(c) a strain point that is greater than or equal to 650° C.;
(d) a linear coefficient of thermal expansion (CTE) over the temperature range 0-300° C. which satisfies the relationship:

$$28 \times 10^{-7}/° C. \leq CTE \leq 34 \times 10^{-7}/° C.$$

It should be noted that the ranges specified above include the end points of the range. For example, when $SiO_2$ is specified to have a concentration of 64.0-71.0 mole percent on an oxide basis, the 64.0 and 71.0 values are included in the permissible values for the $SiO_2$ concentration. Similarly, when a concentration or other parameter is described as "being between X and Y," the X and Y values are included as part of the range.

Additional features and advantages of the invention are set forth in the detailed description which follows and, in part, will be readily apparent to those skilled in the art from that description or recognized by practicing the invention as described herein. The accompanying drawings are included to provide a further understanding of the invention, and are incorporated in and constitutes a part of this specification.

It is to be understood that the various features of the invention disclosed in this specification and in the drawings can be used in any and all combinations. More generally, both the above summary and the following detailed description are merely exemplary of the invention and are intended to provide an overview or framework for understanding the nature and character of the invention.

V. BRIEF DESCRIPTION OF THE DRAWINGS

VI. DETAILED DESCRIPTION OF THE INVENTION

Figure 1:
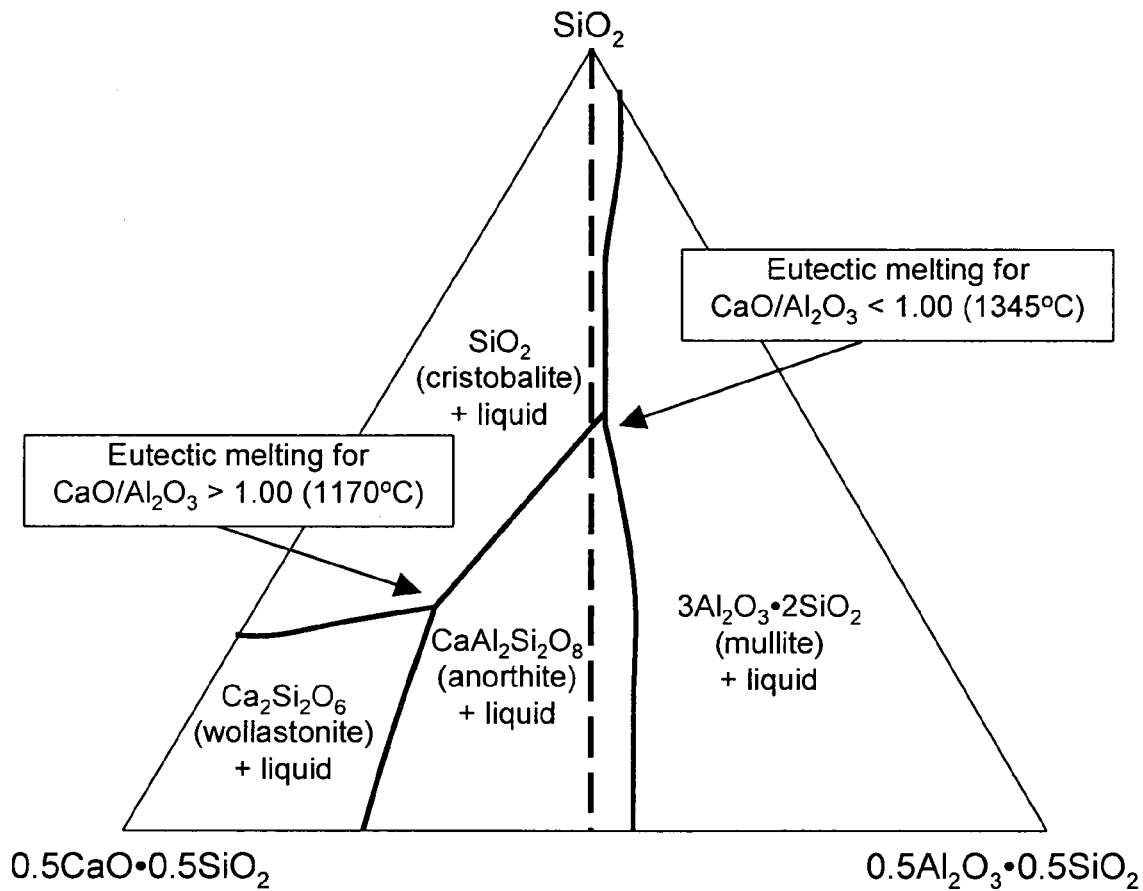
FIG. 1 is a liquidus phase diagram of the CaO—$Al_2O_3$—$SiO_2$ system.

As discussed above, the present invention is concerned with improved glasses for use as substrates in flat panel displays, e.g., AMLCDs. In particular, the glasses meet the various property requirements of such substrates. The major components of the glass are $SiO_2$, $Al_2O_3$, $B_2O_3$, and at least two alkaline earth oxides, i.e., at least MgO and CaO.

$SiO_2$ serves as the basic glass former of the glasses of the invention. Its concentration should be greater than 64 mole percent in order to provide the glass with a density and chemical durability suitable for a flat panel display glass, e.g., an AMLCD glass, and a liquidus temperature (liquidus viscosity) which allows the glass to be formed by a downdraw process (e.g., a fusion process).

In particular, to be suitable for use in flat panel display applications, in particular, AMLCDs, the glasses of the invention preferably have a density less than or equal to 2.45 grams/cm$^3$ (more preferably, less than or equal to 2.43 grams/cm$^3$, most preferably, less than or equal to 2.41 grams/cm$^3$), a weight loss which is less than or equal to 0.8 milligrams/cm$^2$ when a polished sample is exposed to a 5% HCl solution for 24 hours at 95° C., and a weight loss of less than 1.5 milligrams/cm$^2$ when exposed to a solution of 1 volume of 50 wt. % HF and 10 volumes 40 wt. % $NH_4F$ at 30° C. for 5 minutes.

To be formed by a downdraw process, the glasses preferably have a liquidus viscosity which is greater than or equal to 100,000 poises, more preferably greater than or equal to 150,000 poises, and most preferably greater than or equal to 200,000 poises.

In terms of an upper limit, the $SiO_2$ concentration should be less than or equal to 71 mole percent to allow batch materials to be melted using conventional, high volume, melting techniques, e.g., Joule melting in a refractory melter. When the concentration of $SiO_2$ goes above 71 mole percent, the 200 poise temperature (melting temperature) generally rises above 1650° C., which is typically the upper limit for conventional melting processes.

Preferably, the $SiO_2$ concentration is between 66.0 and 70.5 mole percent, more preferably between 66.5 and 70.0 mole percent, and most preferably, between 67.0 and 69.5 mole percent. As a result of their $SiO_2$ content, the glasses of the invention typically have melting temperatures greater than or equal to 1600° C. and less than or equal to 1650° C.

$Al_2O_3$ is another glass former of the glasses of the invention. An $Al_2O_3$ concentration greater than or equal to 9.0 mole percent provides the glass with a low liquidus temperature and a corresponding high liquidus viscosity. The use of at least 9.0 mole percent $Al_2O_3$ also improves the glass' strain point and modulus. In order to achieve an $\Sigma[RO]/[Al_2O_3]$ ratio greater than or equal to 1.00 (see below), the $Al_2O_3$ concentration needs to be kept below 12.0 mole percent. Preferably, the $Al_2O_3$ concentration is between 9.5 and 11.5 mole percent.

$B_2O_3$ is both a glass former and a flux that aids melting and lowers the melting temperature. To achieve these effects, the glasses of the invention have $B_2O_3$ concentrations that are equal to or greater than 7.0 mole percent. Large amounts of $B_2O_3$, however, lead to reductions in strain point (approximately 10° C. for each mole percent increase in $B_2O_3$ above 7.0 mole percent), modulus, and chemical durability.

For use in flat panel (e.g., AMLCD) applications, the glasses of the invention preferably have a strain point equal to or greater than 650° C. (more preferably, equal to or greater than 655° C., most preferably, equal to or greater than 660° C.), a Young's modulus equal to or greater than $10.0 \times 10^6$ psi (more preferably, equal to or greater than $10.3 \times 10^6$ psi; most preferably, equal to or greater than $10.6 \times 10^6$ psi), and a chemical durability as described above in connection with the discussion of the $SiO_2$ content of the glass. A high strain point is desirable to help prevent panel distortion due to compaction/shrinkage during thermal processing subsequent to manufacturing of the glass. A high Young's modulus is desirable since it reduces the amount of sag exhibited by large glass sheets during shipping and handling.

To achieve the above properties, the glasses of the invention have $B_2O_3$ concentrations that are less than or equal to 12.0 mole percent. Preferably, the $B_2O_3$ concentration is between 8.0 and 12.0 mole percent, more preferably between 8.5 and 11.5 mole percent, and most preferably, between 9.0 and 11.0 mole percent.

The $Al_2O_3$ and $B_2O_3$ concentrations are preferably selected as a pair to increase strain point, increase modulus, improve durability, reduce density, and reduce CTE, while maintaining the melting and forming properties of the glass. For example, an increase in $B_2O_3$ and a corresponding decrease in $Al_2O_3$ can be helpful in obtaining a lower density and CTE, while an increase in $Al_2O_3$ and a corresponding decrease in $B_2O_3$ can be helpful in increasing strain point, modulus, and durability, provided that the increase in $Al_2O_3$ does not reduce the $\Sigma[RO]/[Al_2O_3]$ ratio below 1.00. For reference, as discussed above, glasses for use in AMLCD applications preferably have CTE's (0-300° C.) in the range of $28-34 \times 10^{-7}/°$ C.

In addition to the glass formers ($SiO_2$, $Al_2O_3$, and $B_2O_3$), the glasses of the invention also include at least two alkaline earth oxides, i.e., at least MgO and CaO, and, optionally, SrO and/or BaO. The alkaline earth oxides provide the glass with various properties important to melting, fining, forming, and ultimate use.

In accordance with the invention, it has been found that the MgO concentration in the glass and the glass' $\Sigma[RO]/[Al_2O_3]$ ratio, where $[Al_2O_3]$ is the mole percent of $Al_2O_3$ and $\Sigma[RO]$ equals the sum of the mole percents of MgO, CaO, SrO, and BaO, are critical to the glass' performance and, in particular, are critical with regard to meltability and fining.

Although not wishing to be bound by any particular theory of operation, it is believed that following aspects of glass chemistry are involved in the roles of MgO and the $\Sigma[RO]/[Al_2O_3]$ ratio in the glasses of the invention.

As is known in the art, in aluminosilicate glasses, $Al^{3+}$ ions seek to be surrounded by four oxygen ions ($O^{2-}$). One means by which this occurs is traditionally called a charge-balance interaction. A silicon ion ($Si^{4+}$) bonded to four $O^{2-}$ can be thought of as contributing $\frac{1}{4} \times (+4)$ or an incremental charge of +1 towards the bonding requirements of each $O^{2-}$. If one of these oxygen ions is bonded in turn to a 4-fold coordinated $Al^{3+}$, then there is an additional contribution of $\frac{1}{4} \times (+3) = +\frac{3}{4}$ towards the bonding requirements of the $O^{2-}$ ion, for a total of $+1\frac{3}{4}$. The remaining $+\frac{1}{4}$ can be obtained by a nearby +2 cation such as an alkaline earth, e.g., $\frac{1}{8} \times (+2) = +\frac{1}{4}$. The total charge contributed by positively charged ions exactly balances the negative charge of the oxygen ions, and aluminum can remain in 4-fold coordination. The +2 cations that serve in this role are referred to as charge-balancing cations. Provided that the $\Sigma[RO]/[Al_2O_3]$ ratio is 1 or more, it then follows that nearly all aluminum in calcium aluminosilicate glasses is 4-fold coordinated by oxygen. See M Taylor, G E Brown, Structure of mineral glasses: I. The feldspar glasses $NaAlSi_3O_8$, $KAlSi_3O_8$, $CaAl_2Si_2O_8$. *Geochim. Cosmochim Acta* 43:61-75 (1979); P. McMillan, B. Piriou, A Navrotsky, A Raman spectroscopic study of glasses along the joins silica-calcium aluminate, silica-sodium aluminate, and silica-potassium aluminate. *Geochim Cosmochim Acta* 46:2021-2037 (1982); and A Navrotsky, G Peraudeau, P McMillan, J P Coutures, A thermochemical study of glasses and crystals along the joins silica-calcium aluminate and silica-sodium aluminate. *Geochim Cosmochim Acta* 46:2039-2047 (1982). As is also known in the art, the efficacy of charge-balance by +2 cations varies inversely with their size. The usual explanation for this is that small +2 cations polarize oxygen ions and destabilize their bonds with other cations. See K L Geisinger, G V Gibbs, A Navrotsky, A molecular orbital study of bond length and angle variations in framework silicates. *Phys Chem Minerals* 11: 266-285 (1985); and A Navrotsky, K L Geisinger, P McMillan, G V Gibbs, The tetrahedral framework in glasses and melts-inferences from molecular orbital calculations and physical properties. *Phys Chem Minerals* 11:284-298 (1985). The preferred +2 cations in the invention are CaO, MgO and SrO, in order of maximum concentration. The $Ca^{2+}$ ion is better at stabilizing aluminum in 4-fold coordination than the $Mg^{2+}$ ion, but not as effective as the $Sr^{2+}$ ion. In the glasses of the present invention, $Sr^{2+}$ will be completely consumed in charge-balancing interactions, followed by $Ca^{2+}$ up to the limit that virtually all $Al^{3+}$ ions are stabilized in 4-fold coordination by $Ca^{2+}$ or $Sr^{2+}$. If $Al^{3+}$ ions remain that still require charge-balance, $Mg^{2+}$ ions will be used for this purpose until the remaining $Al^{3+}$ ions are stabilized in 4-fold coordination.

The alkaline earth ions that are not used to stabilize aluminum in 4-fold coordination will tend to share oxygen ions with adjacent silicon ions. In this role, the alkaline earths are termed network modifying cations, because they break up the tetrahedral network of Si—O—Si and Si—O—Al bonds. Given the compositional constraints outlined below, the only alkaline earth ions that can be available as network modifying cations are $Ca^{2+}$ and $Mg^{2+}$. In breaking up the network structure of the glass, the modifying cations contribute to reduced viscosity at elevated temperature, thereby facilitating the basic melting process. They also reduce the solubility of gases in the glass, thereby reducing the possibility of bubble nucleation and growth at high temperature. Further, they attack silica particles in the batch materials, causing them to be rapidly incorporated into a homogeneous melt. Finally, and most important for the present invention, they can reduce the stability of crystalline silica (e.g., cristobalite), stabilizing the liquid and thereby increasing the viscosity at which a crystal first appears on cooling. This is one of the key reasons why the $\Sigma[RO]/[Al_2O_3]$ ratio must be $\geq 1$.

To understand this last role, i.e., the role of reducing the stability of crystalline silica, it is useful to consider the liquidus phase diagram of the $CaO$—$Al_2O_3$—$SiO_2$ system as depicted in FIG. 1 (data used to prepare this figure are from E M Levin, C R Robbins, H F McMurdie, Phase Diagrams for Ceramists. The American Ceramic Society, Inc., Columbus, Ohio (1964), p. 219, converted to mole percent). The curves running through the middle of the diagram denote boundaries in composition space across which the crystal in equilibrium with a liquid changes its identity. At the top of the figure is cristobalite, a crystalline polymorph of $SiO_2$. To the lower right is mullite, approximately $3Al_2O_3.2SiO_2$, an aluminosilicate containing aluminum in 4-, 5- and 6-fold coordination. In the lower middle of the diagram is the calcium aluminosilicate anorthite, $CaAl_2Si_2O_8$, in which the $CaO/Al_2O_3$ ratio is 1.0 and all $Al^{3+}$ ions are 4-fold coordinated by oxygen. The phase in the lower left is wollastonite, $Ca_2Si_2O_6$, in which all $Si^{4+}$ ions are 4-fold coordinated by oxygen, all $Ca^{2+}$ ions are 6-fold coordinated by oxygen, and at least some of the oxygen ions are shared between $Ca^{2+}$ and $Si^{4+}$ ions. The vertical line running through the middle of the triangle denotes compositions for which the $CaO/Al_2O_3$ ratio is exactly 1.0. In each of these regions, the crystal in question is in equilibrium with a molten glass, and the region of equilibrium between liquid and a particular crystal is referred to as the liquidus phase field of the crystal.

Where two liquidus phase fields intersect, the curve indicating the intersection is called a cotectic, and where three phase fields intersect, the point at which the fields converge is referred to as a eutectic. Eutectics are locations where three crystalline phases simultaneously coexist with a liquid. They are, by definition, local minima in the melting temperatures of the particular crystalline assemblage, and therefore are the compositions for which the liquid is most stable relative to any one or combination of the three crystalline phases. Two eutectics are seen in FIG. 1. The first, between cristobalite, anorthite and mullite (right-hand side) is a single melt down to 1345° C., at which point the three crystalline phases simultaneously come into equilibrium with the liquid. The second, between wollastonite, anorthite and cristobalite, is a single melt down to 1170° C., at which point those three phases simultaneously come into equilibrium with the liquid.

Were a crystalline assemblage of wollastonite, cristobalite and anorthite heated up from room temperature, the first appearance of a liquid would be at 1170° C., and the composition of the liquid would be equivalent to that of the corresponding eutectic composition. Likewise, were a crystalline assemblage of anorthite, mullite and cristobalite heated up from room temperature, the first appearance of a liquid would be at 1345° C. and the composition of the liquid would be that of the corresponding eutectic between these phases. Between these two eutectics, temperatures increase monotonically to the line denoting $CaO/Al_2O_3=1.0$. This line denotes a thermal maximum in $RO—Al_2O_3—SiO_2$ systems, for R=Ca, Sr and Ba. In other words, $(Ca, Sr, Ba)O—Al_2O_3—SiO_2$ compositions to the $Al_2O_3$-rich side of the $(Ca, Sr, Ba)O/Al_2O_3=1$ line will melt at the [alkaline earth aluminosilicate]-mullite-cristobalite eutectic composition, and are thermodynamically hindered from melting at the [alkaline earth silicate]-[alkaline earth aluminosilicate]-cristobalite side of the phase diagram.

Figure 2:
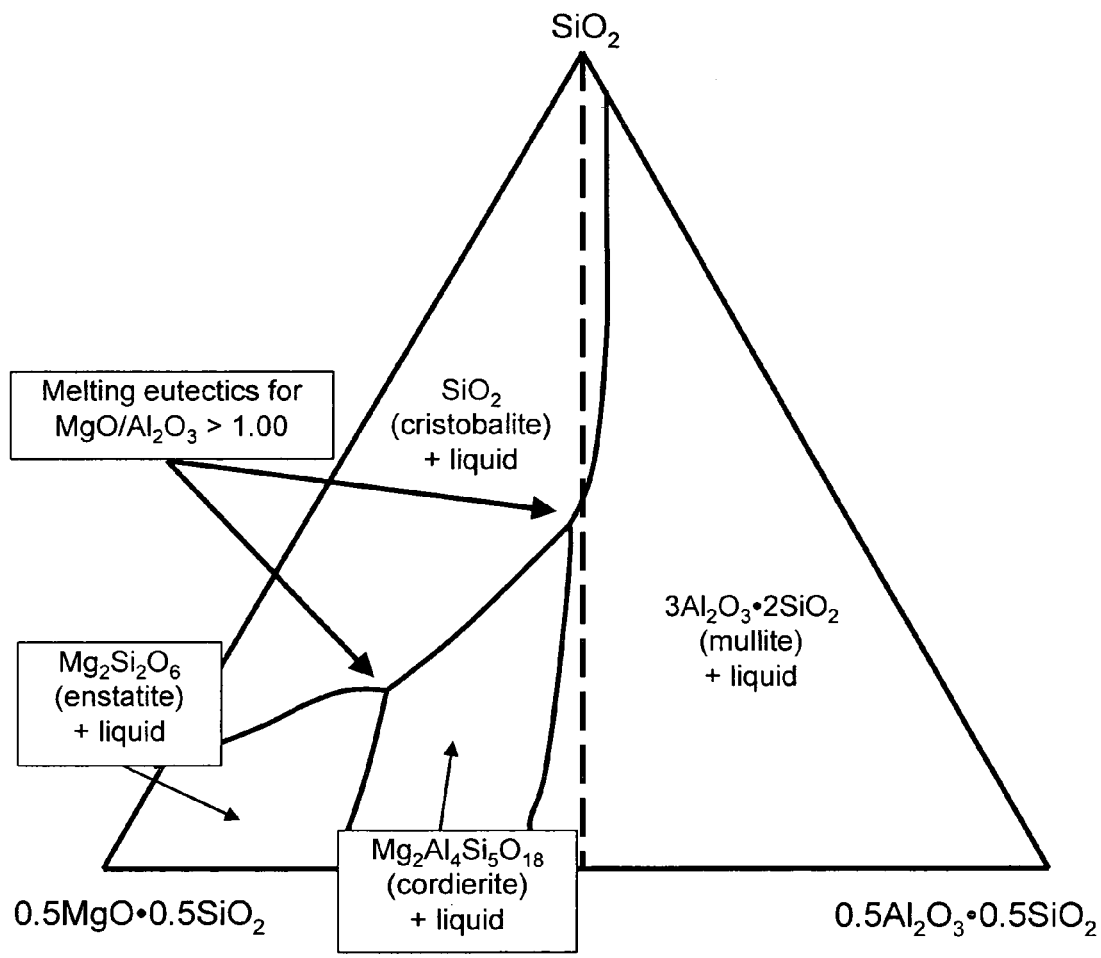
FIG. 2 is a liquidus phase diagram of the MgO—$Al_2O_3$—$SiO_2$ system.

FIG. 2 shows the liquidus phase diagram of the $MgO—Al_2O_3—SiO_2$ system (data used to prepare this figure are from E M Levin, C R Robbins, H F McMurdie, Phase Diagrams for Ceramists. The American Ceramic Society, Inc., Columbus, Ohio (1964), p. 246, converted to mole percent). This system is unique among $RO—Al_2O_3—SiO_2$ systems in that the magnesium aluminosilicate (cordierite)-mullite-cristobalite eutectic composition has an $\Sigma[RO]/[Al_2O_3]$ ratio slightly greater than 1. Unlike the other $RO—Al_2O_3—SiO_2$ systems, initial melting of high-silica compositions in the magnesium-based system will thus tend to occur at eutectics with $\Sigma[RO]/[Al_2O_3]>1.00$. Another point of considerable importance is that the eutectics in question are at much lower silica concentrations than any of the other $RO—Al_2O_3—SiO_2$ systems. Therefore, the lowest liquidus temperatures will be found at comparatively low silica concentrations in the $MgO—Al_2O_3—SiO_2$ system compared to the other $RO—Al_2O_3—SiO_2$ systems.

For the purposes of this invention, the most important consequences of the compositions of early-stage melts pertain to gas solubilities and the appearance of gaseous inclusions in the glass. The solubility of gases is comparatively high in aluminum-rich glasses and falls steeply as the $\Sigma[RO]/[Al_2O_3]$ ratio increases beyond 1.00. Furthermore, silica is the last component to dissolve during melting, and as it does so the solubility of gas decreases considerably. In RO-rich systems, silica dissolution occurs at a comparatively low temperature, thus further inhibiting initial gas solubility. The net impact of this is that RO-rich glasses have low initial gas solubility, and the solubility actually increases as melting proceeds, whereas $Al_2O_3$-rich glasses have very high initial solubility, but it decreases as melting proceeds. As solubility decreases, gas is forced out of the glass and into bubbles. The surfaces of partially-reacted silica particles serve as effective nucleation sites for these bubbles, and help keep them in the body of the glass.

Another key component of the invention is boric oxide, $B_2O_3$. It does not participate significantly in any of the binary or ternary aluminosilicate crystals nor in $SiO_2$, and as a consequence its main impact is to decrease liquidus temperature through simple dilution. The main result is that for a given point on the liquidus surface of, for example, the $CaO—Al_2O_3—SiO_2$ system, the liquidus temperatures will decrease with addition of $B_2O_3$. It is found empirically in high silica liquids that the impact of $B_2O_3$ on liquidus temperatures is about twenty (20) degrees Centigrade per mol %. As an example, the temperature of the anorthite-cristobalite-mullite eutectic (on the $Al_2O_3$-rich side of FIG. 1) decreases from 1345° C. to about 1145° C. when it is diluted by 10 mol % $B_2O_3$. The impact of dilution on liquidus temperatures is commonly referred to as freezing point depression.

A surprising result of composition investigations in AMLCD-type glass compositions is that the substitution of 1-3 mol % MgO for CaO in the $CaO—Al_2O_3—SiO_2$ system causes an abrupt shift in the position of the anothite-mullite-cristobalite liquidus to approximately the same position as the cordierite-mullite-cristobalite liquidus in the $MgO—Al_2O_3—SiO_2$ system. As a consequence, the addition of MgO not only forces all initial melting to the RO-rich side of the phase diagram, but also produces local minima in liquidus temperatures below those that might be expected from either the MgO— or CaO-based systems alone. The former follows from the discussion above concerning the $MgO—Al_2O_3—SiO_2$ system. The latter arises because the addition of a suitably small amount of any oxide will initially reduce liquidus temperatures via freezing point depression. Therefore, while intuitively one would anticipate an increase in liquidus temperatures because of the high temperatures in the ternary systems, i.e., systems having only MgO or CaO, one in fact obtains a decrease from about 1-3 mol %, followed by increasing liquidus temperatures thereafter. Since viscosity is not significantly impacted by the substitution of MgO for CaO, the net result of the decreasing liquidus temperature is an increase in liquidus viscosity. High liquidus viscosities are a prerequisite for precision sheet downdraw processes used to convert molten glass into sheet suitable for AMLCD applications.

Prior to the present invention, it was believed that MgO concentrations equal to or greater than 1 mole percent raised liquidus temperatures (lowered liquidus viscosities), thereby compromising high viscosity forming processes, such as, downdraw processes, e.g., fusion processes. However, as discussed above and illustrated by the examples presented below, it has been found that higher levels of MgO can be used, provided that simultaneously, the $\Sigma[RO]/[Al_2O_3]$ ratio and $SiO_2$ concentration are carefully controlled as described above.

Thus, in sum, the foregoing considerations show that of the alkaline earth oxides, MgO is particularly important with regard to melting and fining. In addition, relative to the other alkaline earth oxides, the presence of MgO results in lower density and CTE, and a higher chemical durability, strain point, and modulus.

In terms of concentrations, MgO should be greater than or equal to 1.0 mole percent in order to achieve the various benefits associated with MgO described above. At concentrations greater than 3.0 mole percent, even with control of the $\Sigma[RO]/[Al_2O_3]$ ratio and the $SiO_2$ concentration, the liquidus temperature rises and liquidus viscosity falls such that forming the glass using a high viscosity forming process (e.g., a fusion process) is compromised. Preferably, the MgO concentration is between 1.2 and 2.8 mole percent, more preferably between 1.4 and 2.6 mole percent, and most preferably, between 1.6 and 2.4 mole percent.

Of the alkaline earth oxides, the CaO concentration in the glasses of the invention is the largest. CaO is essential to producing low liquidus temperatures (high liquidus viscosities), high strain points and moduli, and CTE's in the most desired ranges for flat panel applications, specifically, AMLCD applications. It also contributes favorably to chemical durability, and compared to other alkaline earth oxides it is relatively inexpensive as a batch material. Accordingly, the CaO concentration needs to be greater than or equal to 6.0 mole percent. However, at high concentrations, CaO increases density and CTE. Accordingly, the CaO concentration of the glasses of the invention is less than or equal to 11.5 mole percent. Preferably, the CaO concentration is between 6.5 and 10.5 mole percent.

The remaining alkaline earth oxides—SrO and BaO—can both contribute to low liquidus temperatures (high liquidus viscosities) and thus the glasses of the invention will typically contain at least one of these oxides. However, both oxides increase CTE and density and lower modulus and strain point compared to MgO and CaO. Between SrO and BaO, BaO generally has more adverse effects on glass properties than SrO. Accordingly, the BaO concentration in the glasses of the invention is less than or equal to 0.1 mole percent (preferably, less than 0.05 mole percent), while the SrO concentration is allowed to be greater, i.e., less than or equal to 2.0 mole percent, preferably, less than or equal to 1.0 mole percent. Typically, the sum of the SrO and BaO concentrations will be greater than or equal to 0.4 mole percent, primarily to provide a sufficiently high liquidus viscosity so that the glass can be formed by a downdraw process.

In addition to the above components, the glasses of the invention can include various other oxides to adjust various physical, melting, fining, and forming attributes of the glasses. Examples of such other oxides include, but are not limited to, $TiO_2$, MnO, ZnO, $Nb_2O_5$, $MoO_3$, $Ta_2O_5$, $WO_3$, $Y_2O_3$, $La_2O_3$, and $CeO_2$. The amount of each of these oxides should be less than or equal to 2.0 mole percent, and their total combined concentration should be less than or equal to 5.0 mole percent. The glasses of the invention will also include various contaminants associated with batch materials and/or introduced into the glass by the melting, fining, and/or forming equipment used to produce the glass, such as, $Fe_2O_3$ and $ZrO_2$. The glasses can also contain $SnO_2$ either as a result of Joule melting using tin-oxide electrodes and/or through the batching of tin containing materials, e.g., $SnO_2$, SnO, $SnCO_3$, $SnC_2O_4$, etc.

The glasses of the invention will also normally contain some alkali as contaminants. However, for AMLCD applications, the alkali levels need to be kept below 0.1 mole percent to avoid having a negative impact on thin film transistor (TFT) performance through diffusion of alkali ions from the glass into the silicon of the TFT. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. Preferably, the total alkali concentration is less than or equal to 0.07 mole percent.

As discussed above, in accordance with the invention, it has been found that having an $\Sigma[RO]/[Al_2O_3]$ ratio greater than or equal to 1.00 improves fining, i.e., the removal of gaseous inclusions from the melted batch materials. This improvement allows for the use of more environmentally friendly fining packages. For example, on an oxide basis, the glasses of the invention, can have one or more of the following compositional characteristics:

(i) an $As_2O_3$ concentration of at most 0.05 mole percent;
(ii) an $Sb_2O_3$ concentration of at most 0.05 mole percent;
(iii) a $SnO_2$ concentration of at least 0.01 mole percent.

As is well-known, $As_2O_3$ is the most effective high temperature fining agent for AMLCD glasses, and in some embodiments of the present invention, $As_2O_3$ is used for fining because of its superior fining properties. However, $As_2O_3$ is poisonous and thus requires special handling during the glass manufacturing process. Accordingly, in certain preferred embodiments, fining is performed without the use of substantial amounts of $As_2O_3$, i.e., the finished glass has at most 0.05 mole percent $As_2O_3$. Most preferably, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the strain point in comparison to glasses which use $As_2O_3$ or $SnO_2$ as a fining agent. Accordingly, in certain preferred embodiments, fining is performed without the use of substantial amounts of $Sb_2O_3$, i.e., the finished glass has at most 0.05 mole percent $Sb_2O_3$. Most preferably, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material which has no known hazardous properties. Also, for many years, $SnO_2$ has been a component of AMLCD glasses through the use of tin oxide electrodes in the Joule melting of the batch materials for such glasses (e.g., the melting of Corning Incorporated Code 7059, 1737, and EAGLE 2000 glasses). The presence of $SnO_2$ in AMLCD glasses has not resulted in any known adverse effects in the use of these glasses in the manufacture of liquid crystal displays. $SnO_2$, however, can form crystalline defects in AMLCD glasses when used at high concentrations. Accordingly, the concentration of $SnO_2$ in the finished glass is preferably less than or equal to 0.15 mole percent.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. Also, these other fining techniques can be used by themselves (or in combinations) without the use of tin fining. In all of these cases, maintaining an $\Sigma[RO]/[Al_2O_3]$ ratio and MgO concentration in the ranges discussed above makes the fining process easier to perform and more effective.

The glasses of the invention can be manufactured using various techniques known in the art. Preferably, the glasses are made using a downdraw process and, most preferably, by a fusion downdraw process. Compared to other forming processes, such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. Glass substrates produced according to the present invention and using the fusion process have an average surface roughness as measured by atomic force microscopy of less than 0.5 nm. The substrates also have an average internal stress as measured by optical retardation which is less than or equal to 150 psi.

The invention is further illustrated by the following examples, which are meant to be illustrative, and not in any way limiting, to the claimed invention.

In particular, Table 1 lists examples of the glasses of the invention and comparative glasses in terms of mole percents which are either calculated on an oxide basis from the glass batches in the case of the crucible melts or determined from measurements on the finished glass for the compositions prepared using the continuous melter (see below). Table 1 also lists various physical properties for these glasses, the units for these properties being as follows:

| | |
|---|---|
| Density | grams/centimeter$^3$ |
| CTE | ×10$^{-7}$/° C. (0-300° C.) |
| Strain Point | ° C. |
| Young's Modulus | ×10$^{+6}$ psi |
| Melting Temp. | ° C. |
| Liquidus Temp. | ° C. |
| Liquidus Viscosity | poises |

Inasmuch as the sum of the individual constituents totals or very closely approximates 100, for all practical purposes the reported values may be deemed to represent mole percent. The actual batch ingredients may comprise any materials, either oxides, or other compounds, which, when melted together with the other batch components, will be converted into the desired oxide in the proper proportions. For example, SrCO$_3$ and CaCO$_3$ can provide the source of SrO and CaO, respectively.

The specific batch ingredients used to prepare the glasses of Table 1 were fine sand, alumina, boric acid, magnesium oxide, limestone, strontium carbonate or strontium nitrate, and tin oxide.

The glasses of Examples 1-6, 9-11, 29-31, 33-34, 36-42, and 46-52 were prepared by melting 3,000 gram batches of each glass composition at a temperature and time to result in a relatively homogeneous glass composition, e.g., at a temperature of about 1600° C. for a period of about 16 hours in platinum crucibles. In particular, the batch materials were ball-milled for one hour using ceramic media in a ceramic mill. The batch was transferred to an 1800 cc platinum crucible and loaded into a furnace at 1600° C. After 16 hours, the crucible was removed from the furnace and the glass was poured onto a cold steel plate. When viscous enough to handle, the glass was transferred to an annealing oven at 725° C., held for one hour at this temperature, then cooled at 0.5° C./minute to room temperature.

In Examples 7-8, 12-28, 32, 35, and 43-45, the melting was done in a laboratory scale, continuous, Joule-heated melter. Batches of the raw materials massing 45.4 kg were weighed into a mechanical mixer and combined together for five minutes. An amount of water corresponding to about 0.25 kg was added to the mixture during the last 60 seconds of mixing to reduce dust generation. The mixture was loaded using a screw feeder into a ceramic-lined furnace with tin oxide electrodes and opposing burners firing over the melt surface. The power supplied by the electrodes was controlled by keeping the glass at a near-constant resistivity, corresponding to temperatures between 1590° C. and 1610° C. The glass moved from the melter into a platinum-based conditioning system consisting of a high-temperature finer followed by a stir chamber. The finer and stir chamber temperatures were kept constant throughout the experiment, whereas the melt temperature of the ceramic-lined melter was allowed to vary with composition. The glass drained out of the stir chamber through a heated orifice and was rolled into a ribbon approximately 5 mm thick and 30 mm wide. The glass from the ribbon was analyzed periodically for defects, which were identified, counted, and converted to defects per pound. Compositions were obtained from the ribbon via standard chemical methods, and physical properties were obtained as described below.

The glass properties set forth in Table 1 were determined in accordance with techniques conventional in the glass art. Thus, the linear coefficient of thermal expansion (CTE) over the temperature range 0-300° C. is expressed in terms of ×10$^{-7}$/° C. and the strain point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81). The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity in poises was determined from the liquidus temperature and the coefficients of the Fulcher equation. Young's modulus values in terms of Mpsi were determined using a resonant ultrasonic spectroscopy technique of the general type set forth in ASTM E1875-00e1.

As can be seen in Table 1, Examples 1-43 have densities, CTE's, strain points, and Young's modulus values that make the glasses suitable for use in display applications, such as AMLCD applications. Although not shown in Table 1, the glasses also have chemical durabilities suitable for these applications. In particular, Examples 12, 13, 23 and 28 were each found to have 110BHF values of between 1.25 and 1.35 milligrams/cm$^2$ and HCl durabilities of between 0.5 and 0.8 milligrams/cm$^2$. The glasses of Examples 1-43 can also be formed using downdraw techniques, such as the fusion technique. Thus, they have liquidus temperatures less than or equal to 1170° C. and liquidus viscosities equal to or greater than 100,000, and in most cases, equal to or greater than 150,000.

Glasses having the compositions and properties shown in Examples 23 and 28 are currently regarded as representing the most preferred embodiments of the invention, that is, as providing the best combination of properties for the purposes of the invention at this time.

Examples 44 and 45 illustrate glasses which have liquidus viscosities less than 100,000 poises. Example 44 was found to produce mullite upon crystallization, which is an undesirable liquidus phase for downdraw processes. The presence of this phase can be eliminated by a small increase in the Σ[RO]/[Al$_2$O$_3$] ratio. More generally, in the compositional space of the present invention, localized regions exist where the liquidus phase is mullite. These regions can be easily recognized by persons skilled in the art from the present disclosure and avoided by small changes in the Σ[RO]/[Al$_2$O$_3$] ratio.

Example 45 has a MgO concentration close to the upper limit of 3.0 mole percent. As noted above, as MgO increases, the liquidus temperatures initially go down but then increase. Example 45 illustrates this later effect.

Examples 46-48 have $\Sigma[RO]/[Al_2O_3]$ ratios of less than 1.00 and thus have either a low liquidus viscosity (Example 46) or high melting temperatures (Examples 47 and 48). Examples 48-52 have MgO concentrations less than 1.0 mole percent and thus have high or marginal melting temperatures (Examples 48-50) or high CTE's (Examples 51 and 52).

Figure 3:
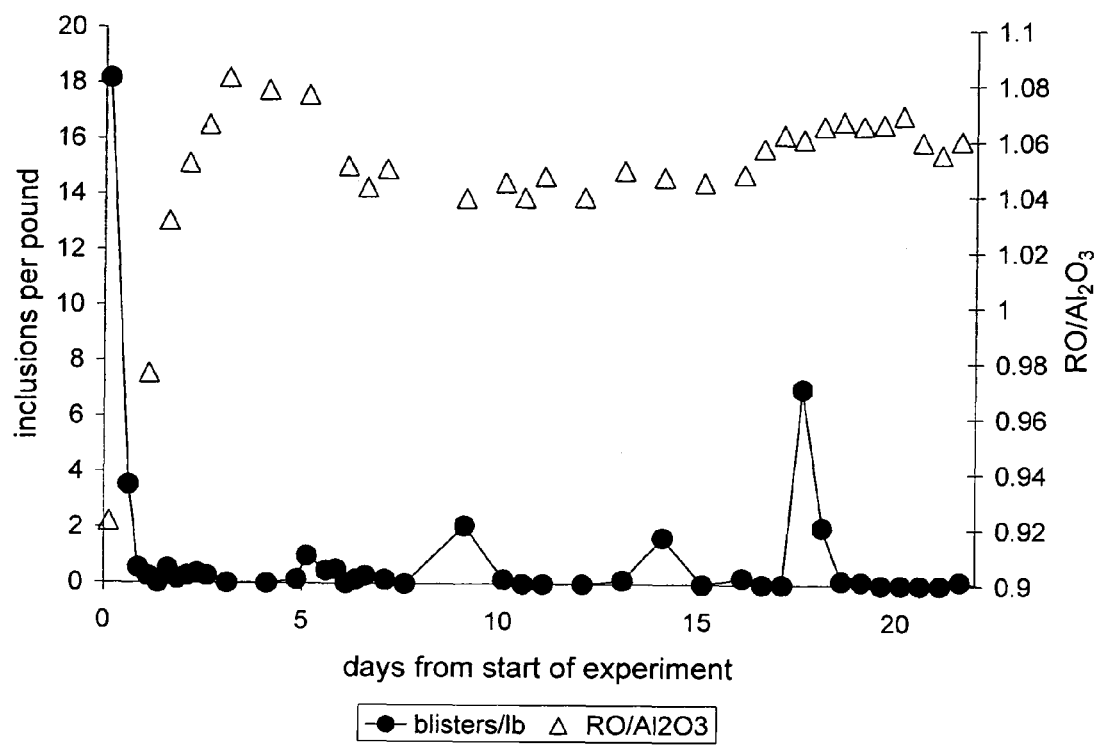
FIG. 3 shows the effect of the $\Sigma[RO]/[Al_2O_3]$ ratio on inclusions (blisters) per pound values for a multi-day experiment.

FIG. 3 illustrates the dramatic improvement in defect levels that can be achieved by switching the $\Sigma[RO]/[Al_2O_3]$ ratio of a glass from below 1.00 to above 1.00. This graph shows the results of an experimental study done over a 30 day period in which the $\Sigma[RO]/[Al_2O_3]$ ratio was adjusted by increasing CaO and/or MgO at the expense of $Al_2O_3$ and/or $SiO_2$. The triangular data points show the $\Sigma[RO]/[Al_2O_3]$ ratios on the various days of the experiment, and the solid circles show the number of inclusions per pound. As can be seen, as soon as the $\Sigma[RO]/[Al_2O_3]$ ratio broke through the 1.00 level, the inclusion level dropped by essentially two orders of magnitude and remained at low levels even with changes in CaO and/or MgO. Throughout the experiment, the MgO concentration was greater than 1.0 mole percent and the $SiO_2$ concentration was less than 71 mole percent.

The glass of Example 23 was produced using a downdraw process, specifically, a full-scale fusion process, and was found to produce a population of 50 sequential glass sheets which had an average inclusion level of less than 0.05 gaseous inclusions/cubic centimeter, each sheet in the population having a volume of at least 500 cubic centimeters.

Although the invention has been described in detail for the purpose of illustration, it is understood that such detail is solely for that purpose and variations can be made therein by those skilled in the art without departing from the spirit and scope of the invention which is defined by the following claims.

TABLE 1

|  | 1 | 2 | 3 | 4 | 5 | 6 |
|---|---|---|---|---|---|---|
| Composition (mol %) | | | | | | |
| $SiO_2$ | 68.80 | 68.64 | 68.95 | 68.95 | 68.98 | 68.98 |
| $Al_2O_3$ | 10.55 | 10.60 | 10.49 | 10.49 | 10.45 | 10.45 |
| $B_2O_3$ | 9.94 | 9.99 | 9.90 | 9.90 | 9.90 | 9.90 |
| MgO | 2.01 | 2.02 | 1.00 | 2.00 | 1.00 | 2.00 |
| CaO | 8.13 | 8.18 | 9.09 | 8.09 | 9.10 | 8.10 |
| SrO | 0.50 | 0.50 | 0.50 | 0.50 | 0.50 | 0.50 |
| $SnO_2$ | 0.07 | 0.07 | 0.07 | 0.07 | 0.07 | 0.07 |
| $\Sigma[RO]/[Al_2O_3]$ | 1.01 | 1.01 | 1.01 | 1.01 | 1.01 | 1.01 |
| Properties | | | | | | |
| Density | 2.378 | 2.378 | 2.385 | 2.381 | — | — |
| CTE | 31.3 | 31.5 | 32.0 | 30.5 | — | — |
| Strain Point | 677 | 670 | 691 | 688 | — | — |
| Young's Modulus | 10.6 | 10.6 | — | — | — | — |
| Melting Temp. | 1629 | 1641 | 1649 | 1645 | 1640 | — |
| Liquidus Temp. | 1165 | 1150 | 1165 | 1140 | 1145 | 1150 |
| Liquidus Viscosity | 158000 | 235000 | 214000 | 370000 | 262000 | — |
|  | 7 | 8 | 9 | 10 | 11 | 12 |
| Composition (mol %) | | | | | | |
| $SiO_2$ | 69.41 | 68.91 | 68.44 | 68.59 | 68.75 | 69.25 |
| $Al_2O_3$ | 10.19 | 10.40 | 10.60 | 10.55 | 10.49 | 10.21 |
| $B_2O_3$ | 9.96 | 9.94 | 9.99 | 9.94 | 9.90 | 9.96 |
| MgO | 1.87 | 1.98 | 1.21 | 1.21 | 1.20 | 2.04 |
| CaO | 7.98 | 7.45 | 9.19 | 9.14 | 9.09 | 7.96 |
| SrO | 0.52 | 1.25 | 0.50 | 0.50 | 0.50 | 0.51 |
| $SnO_2$ | 0.07 | 0.07 | 0.07 | 0.07 | 0.07 | 0.07 |
| $\Sigma[RO]/[Al_2O_3]$ | 1.02 | 1.03 | 1.03 | 1.03 | 1.03 | 1.03 |
| Properties | | | | | | |
| Density | 2.365 | 2.390 | 2.384 | 2.383 | 2.386 | 2.366 |
| CTE | 30.7 | 31.8 | 32.9 | 32.0 | 31.1 | 31.4 |
| Strain Point | 664 | 665 | 680 | 674 | 689 | 664 |
| Young's Modulus | — | — | 10.5 | 10.6 | — | — |
| Melting Temp. | 1641 | 1631 | 1628 | 1632 | 1646 | 1640 |
| Liquidus Temp. | 1145 | 1120 | 1135 | 1140 | 1150 | 1150 |
| Liquidus Viscosity | 263000 | 371000 | 294000 | 279000 | 273000 | 225000 |
|  | 13 | 14 | 15 | 16 | 17 | 18 |
| Composition (mol %) | | | | | | |
| $SiO_2$ | 68.84 | 68.18 | 69.16 | 67.59 | 67.65 | 69.32 |
| $Al_2O_3$ | 10.42 | 10.69 | 10.28 | 11.06 | 11.06 | 10.17 |
| $B_2O_3$ | 9.94 | 10.04 | 9.88 | 9.84 | 9.74 | 9.86 |
| MgO | 1.98 | 1.49 | 1.80 | 2.25 | 2.26 | 2.33 |

TABLE 1-continued

|  |  |  |  |  |  |  |
|---|---|---|---|---|---|---|
| CaO | 7.42 | 8.84 | 8.30 | 8.65 | 8.67 | 7.74 |
| SrO | 1.33 | 0.69 | 0.51 | 0.54 | 0.55 | 0.51 |
| $SnO_2$ | 0.07 | 0.07 | 0.07 | 0.07 | 0.07 | 0.07 |
| $\Sigma[RO]/[Al_2O_3]$ | 1.03 | 1.03 | 1.03 | 1.03 | 1.04 | 1.04 |
| Properties |  |  |  |  |  |  |
| Density | 2.391 | 2.379 | 2.368 | 2.384 | 2.385 | 2.365 |
| CTE | 32.3 | 32.5 | 31.1 | 31.5 | 31.6 | 30.4 |
| Strain Point | 664 | 663 | 665 | 665 | 665 | 666 |
| Young's Modulus | — | — | — | — | — | — |
| Melting Temp. | 1622 | 1621 | 1632 | 1612 | 1606 | 1635 |
| Liquidus Temp. | 1105 | 1125 | 1125 | 1140 | 1135 | 1150 |
| Liquidus Viscosity | 530000 | 305000 | 376000 | 195000 | 224000 | 217000 |

|  | 19 | 20 | 21 | 22 | 23 | 24 |
|---|---|---|---|---|---|---|
| Composition (mol %) |  |  |  |  |  |  |
| $SiO_2$ | 69.06 | 68.64 | 68.01 | 68.46 | 69.28 | 69.08 |
| $Al_2O_3$ | 10.23 | 10.46 | 10.66 | 10.49 | 10.18 | 10.23 |
| $B_2O_3$ | 9.97 | 9.90 | 10.11 | 9.99 | 9.79 | 9.88 |
| MgO | 1.87 | 1.82 | 1.84 | 1.84 | 1.85 | 1.88 |
| CaO | 8.31 | 8.62 | 8.71 | 8.66 | 8.34 | 8.37 |
| SrO | 0.49 | 0.49 | 0.60 | 0.49 | 0.49 | 0.49 |
| $SnO_2$ | 0.07 | 0.07 | 0.07 | 0.07 | 0.07 | 0.07 |
| $\Sigma[RO]/[Al_2O_3]$ | 1.04 | 1.04 | 1.05 | 1.05 | 1.05 | 1.05 |
| Properties |  |  |  |  |  |  |
| Density | 2.369 | 2.374 | 2.378 | 2.375 | 2.369 | 2.371 |
| CTE | 31.2 | 31.5 | 32.3 | 31.5 | 31.1 | 31.2 |
| Strain Point | 665 | 664 | 667 | 666 | 666 | 665 |
| Young's Modulus | — | — | — | — | — | — |
| Melting Temp. | 1637 | 1624 | 1616 | 1619 | 1644 | 1621 |
| Liquidus Temp. | 1130 | 1115 | 1130 | 1120 | 1145 | 1135 |
| Liquidus Viscosity | 360000 | 408000 | 275000 | 363000 | 233000 | 243000 |

|  | 25 | 26 | 27 | 28 | 29 | 30 |
|---|---|---|---|---|---|---|
| Composition (mol %) |  |  |  |  |  |  |
| $SiO_2$ | 68.88 | 69.11 | 68.52 | 67.80 | 68.29 | 68.45 |
| $Al_2O_3$ | 10.37 | 10.17 | 10.43 | 10.83 | 10.55 | 10.49 |
| $B_2O_3$ | 9.79 | 9.96 | 10.01 | 9.90 | 9.95 | 9.90 |
| MgO | 1.96 | 2.22 | 1.21 | 2.18 | 2.51 | 2.50 |
| CaO | 8.45 | 7.96 | 9.25 | 8.74 | 8.13 | 8.09 |
| SrO | 0.48 | 0.51 | 0.51 | 0.48 | 0.50 | 0.50 |
| $SnO_2$ | 0.07 | 0.07 | 0.07 | 0.07 | 0.07 | 0.07 |
| $\Sigma[RO]/[Al_2O_3]$ | 1.05 | 1.05 | 1.05 | 1.05 | 1.06 | 1.06 |
| Properties |  |  |  |  |  |  |
| Density | 2.375 | 2.367 | 2.371 | 2.384 | 2.380 | 2.379 |
| CTE | 31.8 | 31.1 | 32.2 | 32.1 | 31.8 | 30.8 |
| Strain Point | 668 | 664 | 665 | 667 | 671 | 669 |
| Young's Modulus | — | — | — | — | 10.7 | 10.6 |
| Melting Temp. | 1630 | 1634 | 1627 | 1612 | 1633 | 1632 |
| Liquidus Temp. | 1120 | 1115 | 1115 | 1120 | 1150 | 1165 |
| Liquidus Viscosity | 408000 | 481000 | 448000 | 330000 | 219000 | 148000 |

|  | 31 | 32 | 33 | 34 | 35 | 36 |
|---|---|---|---|---|---|---|
| Composition (mol %) |  |  |  |  |  |  |
| $SiO_2$ | 69.75 | 67.45 | 68.09 | 68.25 | 68.51 | 68.11 |
| $Al_2O_3$ | 10.70 | 10.88 | 10.55 | 10.49 | 10.30 | 10.44 |
| $B_2O_3$ | 8.16 | 10.02 | 9.94 | 9.90 | 10.03 | 9.85 |
| MgO | 1.28 | 2.04 | 1.71 | 1.70 | 1.65 | 2.98 |
| CaO | 9.58 | 9.00 | 9.14 | 9.09 | 8.93 | 8.05 |
| SrO | 0.46 | 0.54 | 0.50 | 0.50 | 0.51 | 0.50 |
| $SnO_2$ | 0.07 | 0.07 | 0.07 | 0.07 | 0.07 | 0.07 |
| $\Sigma[RO]/[Al_2O_3]$ | 1.06 | 1.06 | 1.08 | 1.08 | 1.08 | 1.10 |
| Properties |  |  |  |  |  |  |
| Density | 2.405 | 2.384 | 2.388 | 2.386 | 2.373 | 2.382 |
| CTE | 32.9 | 32.7 | 31.4 | 32.6 | 32.6 | 31.0 |
| Strain Point | 684 | 661 | 673 | 674 | 664 | 668 |
| Young's Modulus | — | — | 10.6 | 10.6 | — | 10.7 |

TABLE 1-continued

|  |  |  |  |  |  |  |
|---|---|---|---|---|---|---|
| Melting Temp. | — | 1610 | 1619 | 1622 | 1640 | 1626 |
| Liquidus Temp. | 1155 | 1135 | 1155 | 1150 | 1130 | 1170 |
| Liquidus Viscosity | — | 200000 | 156000 | 177000 | 311000 | 122000 |

|  | 37 | 38 | 39 | 40 | 41 | 42 |
|---|---|---|---|---|---|---|
| Composition (mol %) |  |  |  |  |  |  |
| $SiO_2$ | 67.95 | 68.73 | 68.73 | 68.65 | 67.75 | 67.91 |
| $Al_2O_3$ | 10.49 | 10.10 | 10.10 | 10.09 | 10.49 | 10.44 |
| $B_2O_3$ | 9.90 | 9.90 | 9.90 | 9.90 | 9.90 | 9.84 |
| MgO | 3.00 | 1.00 | 2.00 | 1.10 | 2.20 | 2.19 |
| CaO | 8.09 | 9.70 | 8.70 | 9.69 | 9.09 | 9.05 |
| SrO | 0.50 | 0.50 | 0.50 | 0.50 | 0.50 | 0.50 |
| $SnO_2$ | 0.07 | 0.07 | 0.07 | 0.07 | 0.07 | 0.07 |
| $\Sigma[RO]/[Al_2O_3]$ | 1.10 | 1.11 | 1.11 | 1.12 | 1.12 | 1.12 |
| Properties |  |  |  |  |  |  |
| Density | 2.385 | — | — | 2.390 | 2.390 | 2.393 |
| CTE | 30.7 | — | — | 33.3 | 33.3 | 33.1 |
| Strain Point | 671 | — | — | 685 | 670 | 668 |
| Young's Modulus | 10.7 | — | — | — | 10.7 | 10.7 |
| Melting Temp. | 1616 | 1637 | 1631 | 1644 | 1611 | 1615 |
| Liquidus Temp. | 1155 | 1150 | 1150 | 1145 | 1145 | 1140 |
| Liquidus Viscosity | 155000 | 201000 | 177000 | 269000 | 173000 | 204000 |

|  | 43 | 44 | 45 | 46 | 47 | 48 |
|---|---|---|---|---|---|---|
| Composition (mol %) |  |  |  |  |  |  |
| $SiO_2$ | 68.53 | 68.79 | 68.09 | 69.25 | 69.25 | 69.25 |
| $Al_2O_3$ | 10.04 | 10.41 | 10.86 | 10.79 | 10.79 | 10.79 |
| $B_2O_3$ | 10.04 | 9.92 | 9.80 | 9.90 | 9.90 | 9.90 |
| MgO | 1.94 | 1.97 | 2.88 | 2.00 | 1.00 | 0.00 |
| CaO | 8.90 | 7.81 | 7.77 | 7.49 | 8.49 | 9.49 |
| SrO | 0.48 | 1.03 | 0.53 | 0.50 | 0.50 | 0.50 |
| $SnO_2$ | 0.07 | 0.07 | 0.07 | 0.07 | 0.07 | 0.07 |
| $\Sigma[RO]/[Al_2O_3]$ | 1.13 | 1.04 | 1.03 | 0.93 | 0.93 | 0.93 |
| Properties |  |  |  |  |  |  |
| Density | 2.373 | 2.385 | 2.380 | — | 2.364 | 2.385 |
| CTE | 32.6 | 31.9 | 30.4 | — | 29.6 | 31.3 |
| Strain Point | 661 | 666 | 669 | — | — | — |
| Young's Modulus | ☐ | — | — | — | — | — |
| Melting Temp. | 1620 | 1622 | 1615 | 1645 | 1688 | 1671 |
| Liquidus Temp. | 1115 | 1210 | 1200 | 1220 | 1200 | 1160 |
| Liquidus Viscosity | 362000 | 52000 | 59000 | 58000 | 137000 | 294000 |

|  | 49 | 50 | 51 | 52 |
|---|---|---|---|---|
| Composition (mol %) |  |  |  |  |
| $SiO_2$ | 68.98 | 68.73 | 68.45 | 68.45 |
| $Al_2O_3$ | 10.45 | 10.10 | 10.19 | 10.09 |
| $B_2O_3$ | 9.90 | 9.90 | 9.90 | 9.90 |
| MgO | 0.00 | 0.00 | 0.30 | 0.30 |
| CaO | 10.10 | 10.70 | 10.59 | 10.69 |
| SrO | 0.50 | 0.50 | 0.50 | 0.50 |
| $SnO_2$ | 0.07 | 0.07 | 0.07 | 0.07 |
| $\Sigma[RO]/[Al_2O_3]$ | 1.01 | 1.11 | 1.12 | 1.14 |
| Properties |  |  |  |  |
| Density | 2.394 | 2.375 | 2.397 | 2.395 |
| CTE | 33.4 | 33.4 | 35.6 | 34.7 |
| Strain Point | — | — | 686 | 685 |
| Young's Modulus | — | — | — | — |
| Melting Temp. | 1674 | 1650 | 1637 | 1638 |
| Liquidus Temp. | 1160 | 1160 | 1170 | 1160 |
| Liquidus Viscosity | 246000 | 173000 | 143000 | 172000 |

What is claimed is:

1. An alkali-free glass comprising in mole percent on an oxide basis:

| | |
|---|---|
| SiO$_2$: | 64.0-71.0 |
| Al$_2$O$_3$: | 9.0-12.0 |
| B$_2$O$_3$: | 7.0-12.0 |
| MgO: | 1.0-3.0 |
| CaO: | 6.0-11.5 |
| SrO: | 0-2.0 |
| BaO: | 0-0.1 | wherein:
 (a) $1.00 \leq \Sigma[RO]/[Al_2O_3] \leq 1.25$,
where [Al$_2$O$_3$] is the mole percent of Al$_2$O$_3$ and $\Sigma$[RO] equals the sum of the mole percents of MgO, CaO, SrO, and BaO;
 (b) the glass has the compositional characteristic that on an oxide basis, the glass comprises at least 0.01 mole percent SnO$_2$; and
 (c) the glass has a density that is less than or equal to 2.41 grams/cm$^3$.

2. The glass of claim 1 wherein the glass has the additional compositional characteristic that on an oxide basis, the glass comprises at most 0.05 mole percent Sb$_2$O$_3$.

3. The glass of claim 1 wherein the glass has the further compositional characteristic that on an oxide basis, the glass comprises at most 0.05 mole percent As$_2$O$_3$.

4. The glass of claim 2 wherein the glass has the further compositional characteristic that on an oxide basis, the glass comprises at most 0.05 mole percent As$_2$O$_3$.

5. An alkali-free glass comprising in mole percent on an oxide basis:

| | |
|---|---|
| SiO$_2$: | 64.0-71.0 |
| Al$_2$O$_3$: | 19.0-12.0 |
| B$_2$O$_3$: | 7.0-12.0 |
| MgO: | 1.0-3.0 |
| CaO: | 6.0-11.5 |
| BaO: | 0-0.1 | wherein the glass has the compositional characteristics:
 (a) on an oxide basis, SrO is at most 1.0 mole percent;
 (b) on an oxide basis, the glass comprises at least 0.01 mole percent SnO$_2$; and
 (c) $1.00 \leq \Sigma[RO]/[Al_2O_3] \leq 1.25$, where [Al$_2$O$_3$] is the mole percent of Al$_2$O$_3$ and $\Sigma$[RO] equals the sum of the mole percents of MgO, CaO, SrO, and BaO.

6. The glass of claim 5 wherein the glass has a density that is less than or equal to 2.41 grams/cm$^3$.

7. The glass of claim 1 wherein the glass has one or more of the following properties:
 (a) a liquidus viscosity that is greater than or equal to 100,000 poise;
 (b) a strain point that is greater than or equal to 650° C.;
 (c) a linear coefficient of thermal expansion (CTE) over the temperature range 0-300° C. which satisfies the relationship:

$$28 \times 10^{-7}/°C. \leq CTE \leq 34 \times 10^{-7}/°C.$$

8. An alkali-free glass comprising in mole percent on an oxide basis:

| | |
|---|---|
| SiO$_2$: | 64.0-71.0 |
| Al$_2$O$_3$: | 9.0-12.0 |
| B$_2$O$_3$: | 7.0-12.0 |
| MgO: | 1.0-3.0 |
| CaO: | 6.0-11.5 |
| SrO: | 0-1.0 |
| BaO: | 0-0.1 | wherein:

$\Sigma[RO]/[Al_2O_3] \geq 1.00$, where [Al$_2$O$_3$] is the mole percent of Al$_2$O$_3$ and $\Sigma$[RO] equals the sum of the mole percents of MgO, CaO, SrO, and BaO.

9. The glass of claim 8 wherein:

$\Sigma[RO]/[Al_2O_3] \leq 1.25$.

10. The glass of claim 8 wherein the glass has a density that is less than or equal to 2.41 grams/cm$^3$.

11. The glass of claim 8 wherein the glass has one or more of the following properties:
 (a) a liquidus viscosity that is greater than or equal to 100,000 poise;
 (b) a strain point that is greater than or equal to 650° C.;
 (c) a linear coefficient of thermal expansion (CTE) over the temperature range 0-300° C. which satisfies the relationship:

$$28 \times 10^{-7}/°C. \leq CTE \leq 34 \times 10^{-7}/°C.$$

12. The glass of claim 8 wherein the glass has at least one of the following compositional characteristics:
 (a) on an oxide basis, the glass comprises at most 0.05 mole percent As$_2$O$_3$;
 (b) on an oxide basis, the glass comprises at most 0.05 mole percent Sb$_2$O$_3$;
 (c) on an oxide basis, the glass comprises at least 0.01 mole percent SnO$_2$.

13. The glass of claim 12 wherein the glass has compositional characteristics (a) and (b).

14. The glass of claim 12 wherein the glass has compositional characteristics (a) and (c).

15. The glass of claim 12 wherein the glass has compositional characteristics (b) and (c).

16. The glass of claim 12 wherein the glass has compositional characteristics (a), (b), and (c).

* * * * *

UNITED STATES PATENT AND TRADEMARK OFFICE
CERTIFICATE OF CORRECTION

| | | |
|---|---|---|
| PATENT NO. | : 7,851,394 B2 | Page 1 of 1 |
| APPLICATION NO. | : 11/478493 | |
| DATED | : December 14, 2010 | |
| INVENTOR(S) | : Adam James Ellison et al. | |

It is certified that error appears in the above-identified patent and that said Letters Patent is hereby corrected as shown below:

Col.  Line

21    38    Please delete "$Al_2O_3$:    19.0-12.0" and add --$Al_2O_3$:    9.0-12.0--

Signed and Sealed this
Thirty-first Day of May, 2011

David J. Kappos
*Director of the United States Patent and Trademark Office*